(12) United States Patent
Barron

(10) Patent No.: US 8,567,802 B2
(45) Date of Patent: *Oct. 29, 2013

(54) CANTILEVERED, VEHICLE SIDE MOUNT SAFETY GUARD

(75) Inventor: Mark Bowen Barron, Los Angeles, CA (US)

(73) Assignee: Public Transportation Safety Int'l Corp., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/524,401

(22) Filed: Jun. 15, 2012

(65) Prior Publication Data

US 2012/0248799 A1 Oct. 4, 2012

Related U.S. Application Data

(63) Continuation-in-part of application No. 12/844,575, filed on Jul. 27, 2010.

(60) Provisional application No. 61/228,833, filed on Jul. 27, 2009.

(51) Int. Cl.
*B60R 19/54* (2006.01)

(52) U.S. Cl.
USPC .......................................... 280/160; 293/58

(58) Field of Classification Search
USPC .............. 280/159, 160, 762, 770, 152.2, 847, 280/849, 851, 852, 853, 854; 293/58, 128; 296/180.4, 180.1, 180.2, 187.04, 198; 89/36.08

See application file for complete search history.

(56) References Cited

U.S. PATENT DOCUMENTS

| 3,450 | A | | 2/1844 | Tolles | |
|---|---|---|---|---|---|
| 217,676 | A | | 7/1879 | Brown | |
| 223,473 | A | | 1/1880 | Brisac | |
| 346,762 | A | | 8/1886 | Marston | |
| 354,831 | A | | 12/1886 | French | |
| 381,881 | A | | 4/1888 | Mahon | |
| 587,060 | A | | 7/1897 | Noraconk | |
| 711,569 | A | | 10/1902 | Hollis | |
| 993,448 | A | * | 5/1911 | Hunt | 280/159 |
| 1,002,114 | A | * | 8/1911 | Barnes | 293/13 |
| 1,050,405 | A | * | 1/1913 | Gelder | 293/58 |
| 1,065,055 | A | * | 6/1913 | Lawrence | 293/58 |
| 1,132,147 | A | * | 3/1915 | Arbeiter | 280/160 |
| 1,222,828 | A | | 4/1917 | Weinberg | |

(Continued)

FOREIGN PATENT DOCUMENTS

| GB | 809624 | 2/1959 |
|---|---|---|
| JP | 04-176784 | 6/1992 |

*Primary Examiner* — Katy M Ebner
*Assistant Examiner* — Brodie Follman
(74) *Attorney, Agent, or Firm* — Diederiks & Whtielaw, PLC

(57) ABSTRACT

A safety guard which functions to push objects lying in the path of a vehicle out of the path of the wheels of the vehicle, such as a school bus, for safety purposes includes a front guard positioned at an angle in front of a wheel of the vehicle and is secured through a mounting plate unit to both a side panel and either a frame beam or floor board of the vehicle, with the frontal guard being supported in a cantilevered manner in front of the wheel. This configuration provides for a substantially universal mounting arrangement that can be particular advantageous in connection with school buses and other vehicles having underbody frame and support structure remote from the vehicle wheel.

21 Claims, 5 Drawing Sheets

(56) References Cited

U.S. PATENT DOCUMENTS

| | | | | | |
|---|---|---|---|---|---|
| 1,232,835 | A | * | 7/1917 | Ostrowiecki | 293/38 |
| 1,372,081 | A | * | 3/1921 | Myers | 280/848 |
| 1,397,825 | A | | 11/1921 | Thompson | |
| 1,411,254 | A | | 4/1922 | Braucci | |
| 1,485,332 | A | * | 2/1924 | Edwards | 293/107 |
| 1,511,085 | A | * | 10/1924 | McIntyre | 293/128 |
| 1,553,656 | A | | 9/1925 | Williams | |
| 1,730,733 | A | | 10/1929 | Judd | |
| 1,805,933 | A | | 5/1931 | Victor | |
| 1,848,310 | A | | 3/1932 | Brown | |
| 1,885,611 | A | * | 11/1932 | Lilley | 37/263 |
| 1,899,937 | A | | 3/1933 | Brown | |
| 2,017,227 | A | * | 10/1935 | Barnhart | 280/849 |
| 2,038,234 | A | * | 4/1936 | Olen | 280/851 |
| 2,336,536 | A | | 12/1943 | Fergueson | |
| 2,605,119 | A | * | 7/1952 | Earnest | 280/849 |
| 2,647,763 | A | | 8/1953 | Hudson | |
| 3,337,238 | A | | 8/1967 | Weasel, Jr. | |
| 3,341,222 | A | | 9/1967 | Roberts | |
| 3,560,021 | A | | 2/1971 | Watson | |
| 3,675,943 | A | * | 7/1972 | Moore et al. | 280/851 |
| 3,721,459 | A | * | 3/1973 | Lea | 280/851 |
| 3,784,226 | A | | 1/1974 | Wilfert et al. | |
| 3,794,373 | A | | 2/1974 | Manning | |
| 3,809,167 | A | | 5/1974 | Glider | |
| 3,866,943 | A | * | 2/1975 | Innis | 280/851 |
| 3,874,697 | A | | 4/1975 | Thompson | |
| 3,934,901 | A | * | 1/1976 | Hammerly | 280/851 |
| 4,124,221 | A | * | 11/1978 | Goings | 280/851 |
| 4,203,623 | A | | 5/1980 | Fenner et al. | |
| 4,205,861 | A | | 6/1980 | Roberts et al. | |
| 4,262,953 | A | * | 4/1981 | McErlane | 296/180.4 |
| 4,325,563 | A | * | 4/1982 | Brandon et al. | 280/851 |
| 4,362,310 | A | * | 12/1982 | Goodall | 280/157 |
| 4,377,294 | A | * | 3/1983 | Lockwood et al. | 280/851 |
| 4,627,594 | A | * | 12/1986 | Reed | 248/632 |
| 4,640,541 | A | * | 2/1987 | FitzGerald et al. | 296/180.1 |
| 4,688,824 | A | * | 8/1987 | Herring | 280/762 |
| 4,763,939 | A | | 8/1988 | Zhu | |
| 4,877,266 | A | * | 10/1989 | Lamparter et al. | 280/762 |
| 4,944,104 | A | | 7/1990 | Kowalczyk | |
| 5,027,990 | A | * | 7/1991 | Sonnenberg | 224/42.2 |
| 5,199,762 | A | | 4/1993 | Scheele et al. | |
| 5,280,990 | A | * | 1/1994 | Rinard | 296/180.1 |
| 5,333,923 | A | * | 8/1994 | Whitfield | 293/128 |
| 5,462,324 | A | * | 10/1995 | Bowen et al. | 293/15 |
| 5,735,560 | A | | 4/1998 | Bowen et al. | |
| 5,823,586 | A | * | 10/1998 | Marley | 293/126 |
| 5,847,642 | A | | 12/1998 | Esposito et al. | |
| 5,961,137 | A | * | 10/1999 | Knight | 280/160 |
| 6,007,102 | A | | 12/1999 | Helmus | |
| 6,095,562 | A | * | 8/2000 | Busse | 280/762 |
| 6,152,469 | A | | 11/2000 | Gadowski | |
| 6,263,996 | B1 | | 7/2001 | Welch | |
| 6,554,306 | B1 | | 4/2003 | Gaspar | |
| 6,827,372 | B2 | | 12/2004 | Barr et al. | |
| 6,886,862 | B2 | | 5/2005 | Matthew | |
| 7,192,078 | B2 | | 3/2007 | Buley et al. | |
| 7,258,366 | B2 | | 8/2007 | Yingling et al. | |
| 7,793,985 | B1 | | 9/2010 | Coloma | |
| 7,806,464 | B2 | | 10/2010 | Cardolle | |
| 7,942,470 | B2 | | 5/2011 | Boivin et al. | |
| 7,992,923 | B2 | | 8/2011 | Dayton | |
| D657,293 | S | | 4/2012 | Barron | |
| D657,724 | S | | 4/2012 | Barron | |
| 8,226,158 | B1 | | 7/2012 | Jackson | |
| 8,322,778 | B1 | | 12/2012 | Pfaff | |
| 2001/0004873 | A1 | * | 6/2001 | Lamparter | 116/28 R |
| 2002/0024213 | A1 | * | 2/2002 | Hawes | 280/854 |
| 2003/0141714 | A1 | * | 7/2003 | Matthew | 280/848 |
| 2004/0140663 | A1 | * | 7/2004 | Barr et al. | 280/847 |
| 2005/0104390 | A1 | | 5/2005 | Norelius | |
| 2005/0110266 | A1 | * | 5/2005 | Barr et al. | 280/847 |
| 2011/0018289 | A1 | * | 1/2011 | Barron | 293/58 |
| 2012/0248799 | A1 | * | 10/2012 | Barron | 293/58 |
| 2012/0286528 | A1 | * | 11/2012 | Barron | 293/58 |

* cited by examiner

US 8,567,802 B2

CANTILEVERED, VEHICLE SIDE MOUNT SAFETY GUARD

CROSS-REFERENCE TO RELATED APPLICATIONS

The present invention constitutes a continuation-in-part of U.S. patent application Ser. No. 12/844,575 filed Jul. 27, 2010 which claims the benefit of U.S. Provisional. Patent Application Ser. No. 61/228,833 filed Jul. 27, 2009, both being entitled "Cantilevered, Vehicle Side Mount Safety Guard".

BACKGROUND OF THE INVENTION

1. Field of the Invention

The present invention pertains to the art of vehicle safety devices and, more particularly, to a safety device mounted to a side body panel of a vehicle and including a guard portion which is supported in front on a wheel set of the vehicle, in a cantilevered manner, for deflecting animate and inanimate objects from in front of the vehicle wheels.

2. Discussion of the Prior Art

Buses are commonly employed for various transportation purposes. For instance, buses are widely employed in metropolitan mass transit systems. Unfortunately, there are inherent dangers associated with the operation of buses. Many of the most serious of these injuries are a result of individuals being run over by the bus, such as when a person slips and falls in the road adjacent, a wheel of the bus and the bus crushes a limb or other body part of the individual. Correspondingly, inanimate objects can also be crushed.

To address these concerns, it has been proposed in the art to mount a safety guard directly in front of wheels on a bus to establish a safety barrier between the wheels and objects. More specifically, as represented by U.S. Pat. Nos. 5,462,324 and 5,735,560, it is known to mount a safety barrier to undercarriage structure of a vehicle, such as a bus, with the safety barrier including a lower edge extending directly along a ground surface. The safety barrier is fixedly supported at various locations, such as to axle, frame and/or suspension structure. The safety barrier is angled such that, if an object is encountered during movement of the bus, the safety barrier forces the object out from under the vehicle to a position out of the path of the vehicle wheels.

In addition to mass transit buses, school buses are widely employed in connection with transporting students for educational purposes. Of course, still other types of buses also exist. Certainly, each of these additional types of buses can benefit from incorporating safety guards. However, many of these buses, particularly school buses, are constructed in quite a different manner than most other buses. Although school buses could receive axle and/or suspension mounted safety guards, the undercarriage frame structure of school buses is distinct such that many of the advantageous methods of mounting safety guards as disclosed in the '324 and '560 patents are simply not well suited for this application. In particular, school buses have undercarriage body portions which are raised quite high, thereby making mounting a safety guard to this structure quite difficult. For at least this reason, various types of buses, particularly school buses, are simply not provided with these known safety guard devices, even though serious injuries and even deaths can be avoided with the use of the safety guards.

Based on the above, there exists the need for a more feasible mounting arrangement for a vehicle underbody safety guard. In particular, there is seen to exist a need for a safety barrier mounting arrangement which will enable safety guards to be readily mounted to a wide range of vehicles in an effective and substantially universal manner, thereby expanding the type of vehicles which can be equipped with injury and even lifesaving safety guards.

SUMMARY OF THE INVENTION

The present invention is directed to providing a safety guard for a vehicle, such as a school bus, including a front guard positioned at an angle in front of a wheel of the vehicle that will function to push individuals and inanimate objects lying in the path of the vehicle out of the path of the wheels for safety purposes. The safety guard is positioned close enough to the ground so that, if an object is encountered, the safety barrier forces the object out from under the vehicle and out of the wheel path. In accordance with the invention, the safety guard is mounted to a side panel of the vehicle, a floor, a floor support or any combination thereof, with the frontal guard being supported in a cantilevered manner in front of the wheels. This configuration provides for a substantially universal mounting arrangement that can be particular advantageous in connection with school buses and other vehicles which are not provided with underbody frame and support structure closely adjacent to the vehicle wheels.

While the invention has particular utility in school buses, it can also be used to prevent injuries in a wide range of vehicles. The safety guard can be mounted with a single side mounting plate, multiple interconnected mounting plates or integrated with a wheel cover. Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
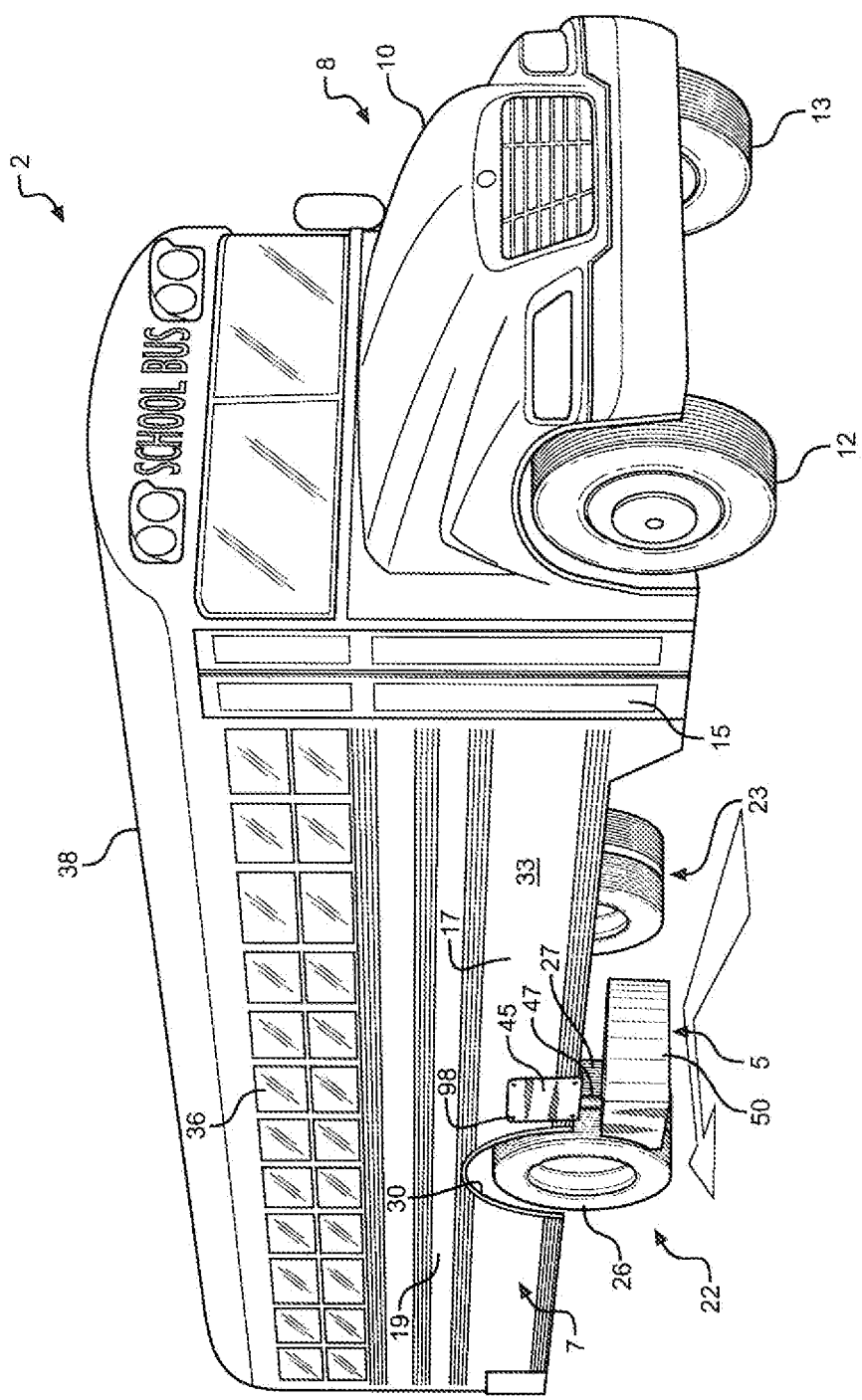
FIG. 1 is a perspective view of a school bus having mounted thereto a safety guard assembly in accordance with a first embodiment of the invention.

With initial reference to FIG. 1, a vehicle 2, shown as a school bus, has attached thereto a safety guard 5 constructed in accordance with the present invention. In general, vehicle 2 includes a body 7 having a front end 8 including a hood 10 beneath which is provided an engine (not shown), and front steerable wheels 12 and 13. Behind front wheels 12 and 13 is shown a forward most side door 15 which leads to a middle section 17 of vehicle body 7 and a rear end section 19. Supporting rear end section 19 is a pair of rear wheel assemblies 22 and 23. Each rear wheel assembly 22, 23 is shown to include dual wheels 26 and 27 arranged in a wheel well 30 created in a side panel 33 of vehicle body 7. Also provided in side panel 33 are various fore-to-aft spaced windows 36 which are vertically arranged below a roof 38. More importantly, in accordance with the present invention, safety guard 5 includes a mounting plate 45, a support post 47 and a frontal guard 50 as will be detailed below.

Figure 2:
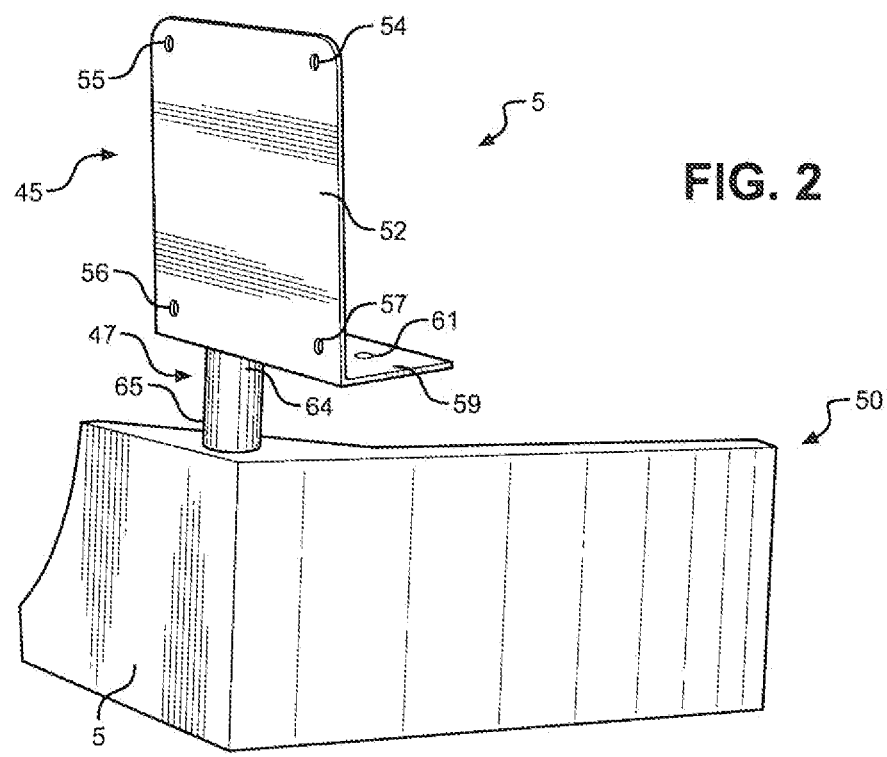
FIG. 2 is a front perspective view of the safety guard assembly of FIG. 1.
Figure 3:
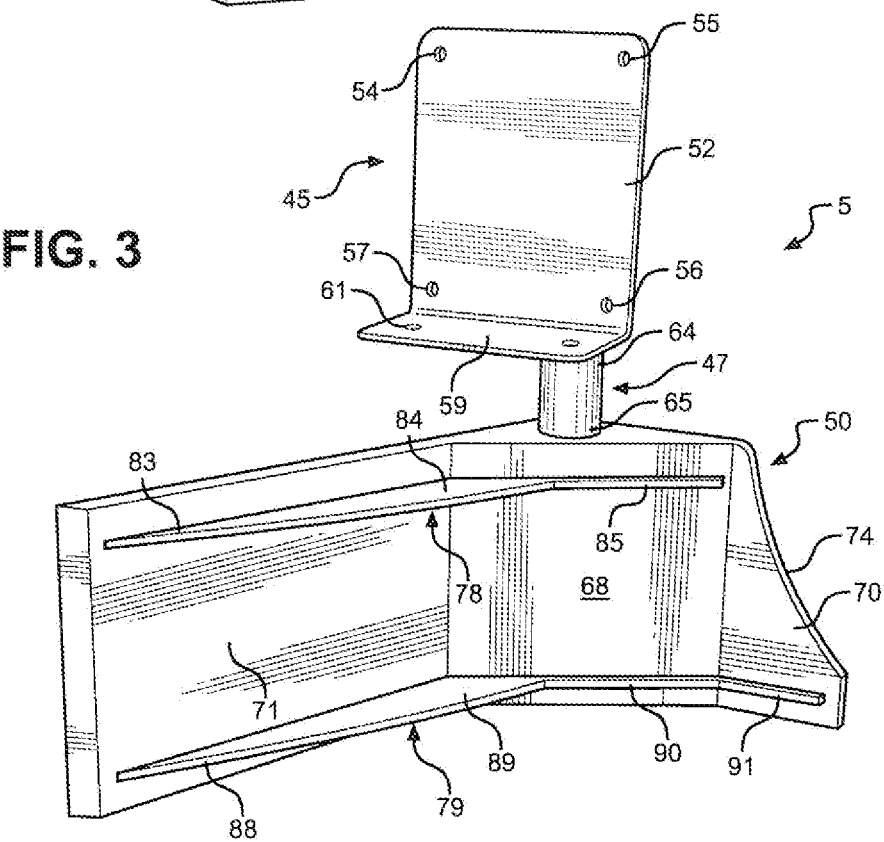
FIG. 3 is a rear perspective view of the safety guard assembly of FIG. 1.

With reference to FIGS. 2 and 3, mounting plate 45 of safety guard 5 includes a side plate portion 52 provided with a plurality of spaced holes 54-57, and a base plate portion 59 provided with holes 61. In the embodiment shown, base plate portion 59 extends substantially perpendicular from side plate portion 52 such that mounting plate 45 is generally L-shaped in side-view. Support post 47 includes a first end 64 fixed to base plate portion 59 and a second end 65 that is secured to a corner body portion 68 of safety guard 5. In addition to corner body portion 68, safety guard 5 also includes a side body portion 70 and a frontal body portion 71 defining frontal guard 50. As clearly shown in these figures, side body portion 70 includes an arcuate terminal edge 74 remote from frontal body portion 71.

As best shown in FIG. 3, frontal guard 50 is also provided with an upper support gusset 78 and a lower support gusset 79. More specifically, upper support gusset 78 tapers from a first end portion 83 to an intermediate portion 84 at a junction with corner body portion 68. Intermediate portion 84 extends to a second end portion 85 within corner body portion 68. In a similar manner, lower support gusset 79 extends from a first end portion 88 to an intermediate portion 89, a second end portion 90 and further includes an extension portion 91 which projects along side body portion 70 below arcuate terminal edge 74.

With this construction, safety guard 5 can be advantageously and efficiently mounted directly to side panel 33 of vehicle body 7, such as in front of rear wheel assembly 22 as clearly shown in FIG. 1. More specifically, side plate portion 52 is positioned against side panel 33 and a plurality of mechanical fasteners 98 fixedly secure safety guard 5 to vehicle body 7 through holes 54-57. At the same time, additional fasteners extend through holes 61 and 62 of base plate portion 59 and into a side panel support frame rail (not shown) in further fixing safety guard 5. When mounting plate 45 is secured in this fashion, frontal guard 50 is positioned in front of wheels 26 and 27, with arcuate terminal edge 74 being spaced from and conforming to wheel 26 at a lower forward portion. At the same time, frontal guard 50 is maintained a few inches, generally in the order of 3-5 inches, above a ground surface (not separately labeled), while being supported in a cantilevered manner through mounting plate 45 and support posts 47. Therefore, even though vehicle 2 does not include frame and other structure located in a position which would enable underbody and multi-point attachments for frontal guard 50, frontal guard 50 is still positioned in a manner which is slightly angled rearwardly and outwardly from a center line of vehicle 2 with this cantilevered mounting arrangement so as to effectively function to push individuals and/or inanimate objects which may lie in the path of vehicle 2 out of the path of wheels 26 and 27, thereby preventing the individuals from being crushed or otherwise damaged by wheels 26 and 27 of vehicle 2.

Figure 4:
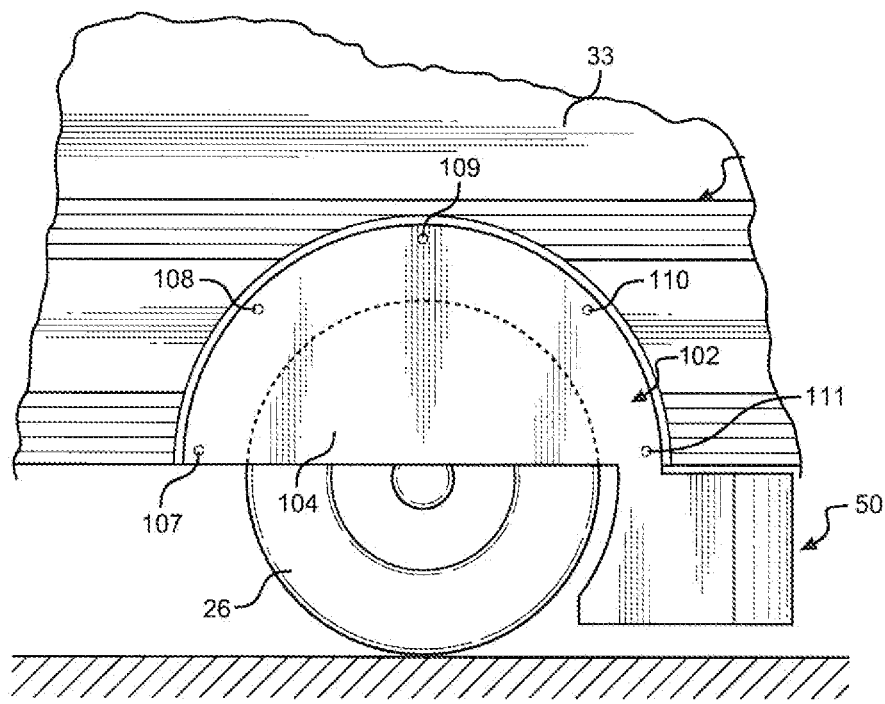
FIG. 4 is a perspective view of a portion of a school bus having mounted thereto a safety guard assembly in accordance with a second embodiment of the invention.

At this point, it should be recognized that the invention is particular concerned with providing a side mount for safety guard 5 that enables frontal guard 50 to be secured in front of wheels 26, 27 in a cantilevered manner. In accordance with another embodiment of the invention, this object is obtained by integrally forming side body portion 70, corner body portion 68 and frontal body portion 71, into a combination wheel well cover and safety guard 102 as shown in FIG. 4. More specifically, combination wheel well cover and safety guard 102 includes a wheel well cover plate 104 provided with various mounting points 107-111 used to fixedly secure wheel well cover portion 102 to side panel 33. In this manner, wheel well cover plate 104 covers approximately the upper half of wheel 26 while also fully supporting frontal guard 50 in a cantilevered manner.

Figure 5:
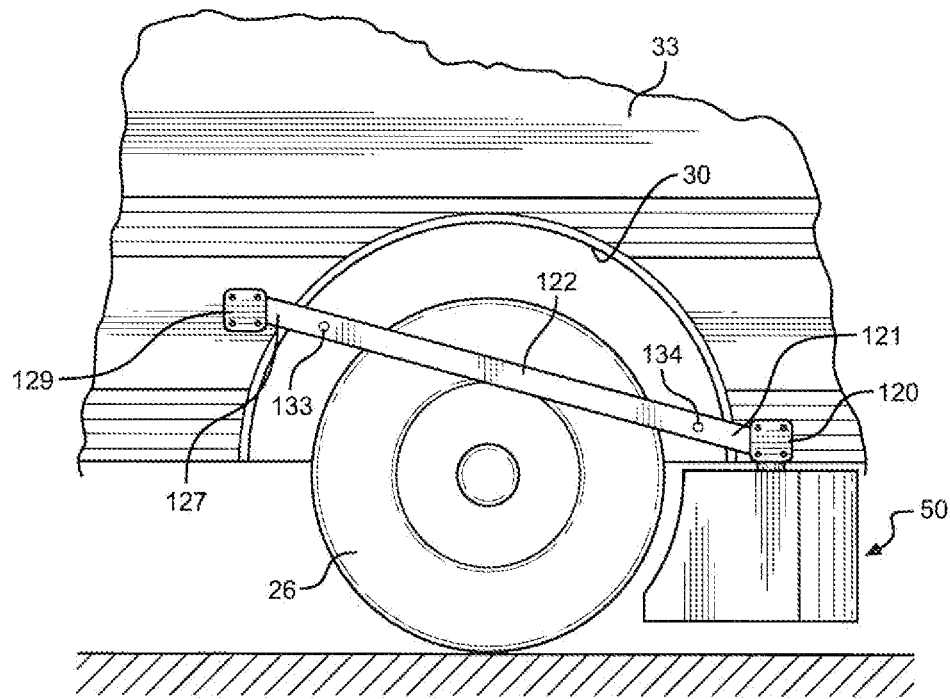
FIG. 5 is a perspective view of a portion of a school bus having mounted thereto a safety guard assembly in accordance with a third embodiment of the invention.

FIG. 5 shows a third embodiment of the invention which is more similar to the embodiment of FIGS. 1-3 in that frontal guard 50 is supported by post 47 and a first side plate 120 secured to side panel 33 to which is fixed a first end 121 of a cross bar 122. Cross bar 122 includes a second end 127 that is fixed to a second side plate 129 that is also secured through various fasteners (not labeled) to side panel 33. As clearly illustrated in FIG. 5, cross bar 122 is preferably provided with multiple apertures, such as those indicated at 133 and 134, which can be utilized in mounting a wheel well cover (not separately shown) similar to that of the embodiment of FIG. 4, with the wheel well cover preferably extending over first and second side plates 120 and 129 for aesthetic purposes.

Figure 6:
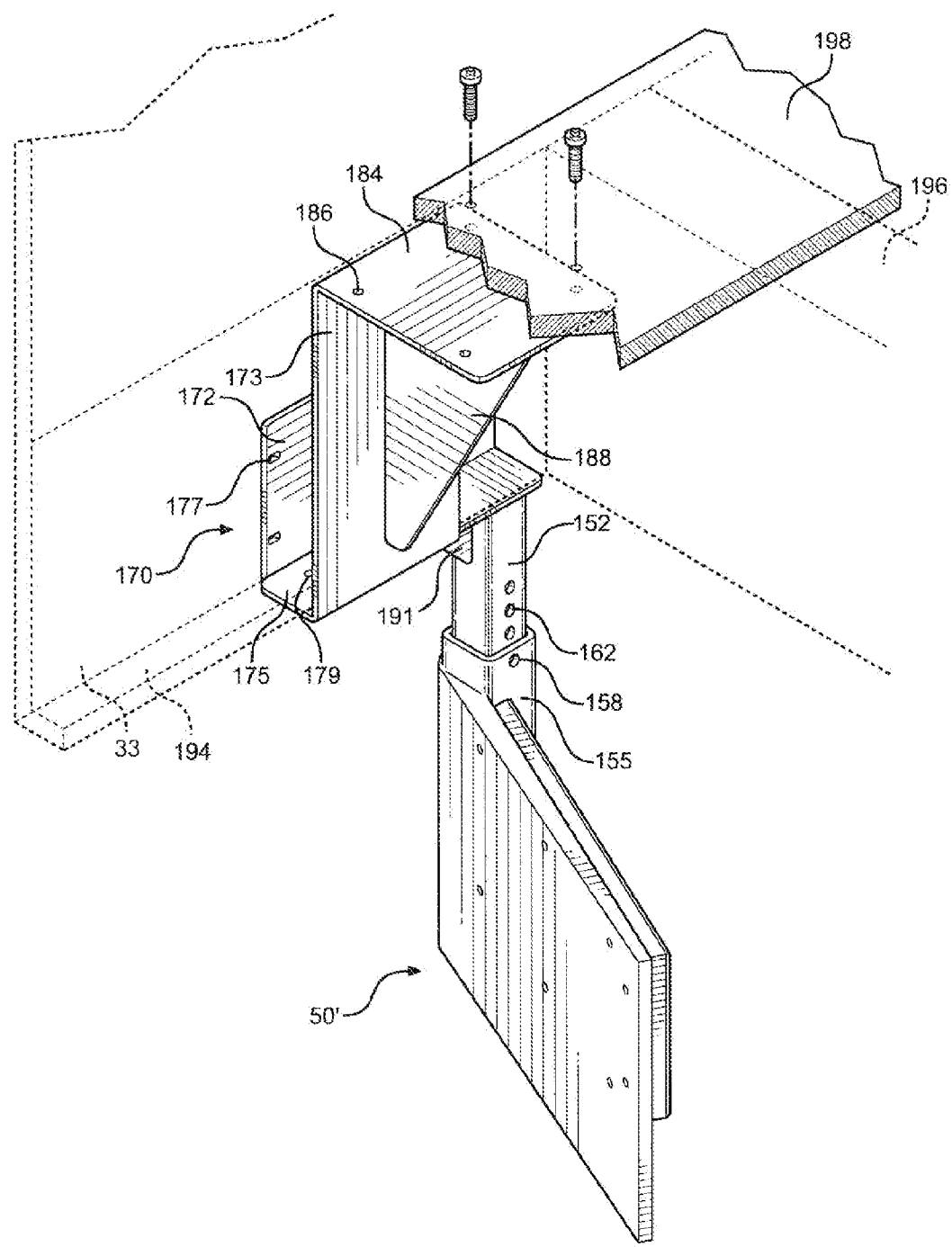
FIG. 6 is a perspective view of a portion of a bus having mounted thereto a safety guard assembly in accordance with a fourth embodiment of the invention.
Figure 7:
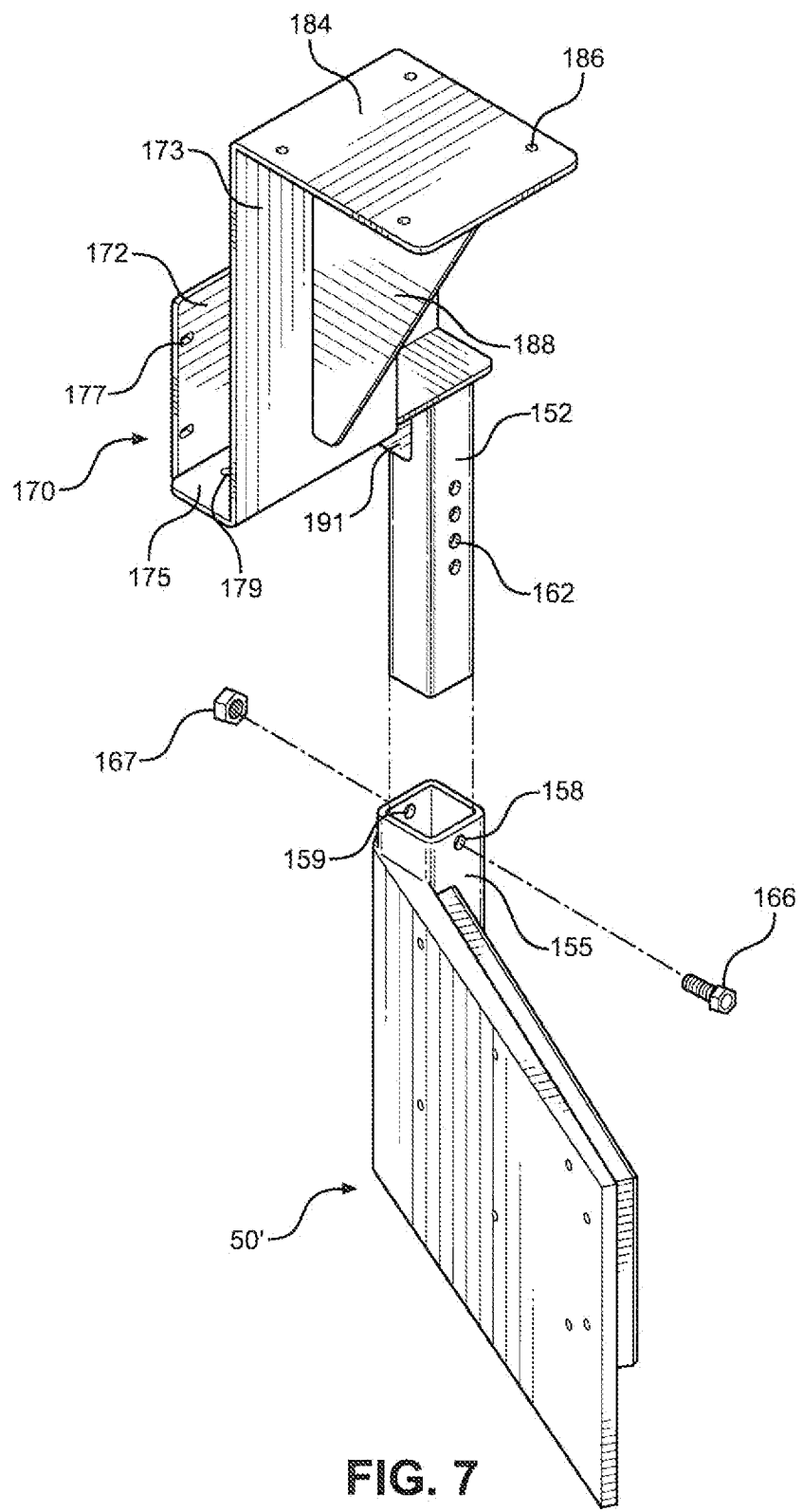
FIG. 7 is an exploded view of the safety guard assembly of FIG. 6.

FIGS. 6 and 7 show a still further variation of the present invention exemplifying how a safety guard 50' can be configured to be vertically adjustable, as well as supported in other manners in accordance with the overall invention. As shown, safety guard 50' includes a support post 152 about which is slidably positioned a mounting sleeve 155 to which a deflector or frontal guard portion (not separately labeled) extends. In the embodiment depicted, an upper portion of sleeve 155 is provided with aligned openings 158 and 159, while post 152 includes a plurality of vertically spaced through holes, one of which is indicated at 162. With this arrangement, safety guard 50' can be conveniently, vertically adjusted, with a bolt 166 extending through opening 158 in sleeve 155, a select set of through holes 162 in post 152, and then opening 159 prior to threadably receiving a nut 167. Basically, this arrangement exemplifies how the safety guard of the invention can be mounted in a vertically adjustable manner in order to accommodate use on vehicles having different ground clearances. Preferably, the support post 152 and the mounting sleeve 155 have complementary, polygonal shaped cross-sections to maintain the desired angling of the frontal guard.

The embodiment of FIGS. 6 and 7 also illustrate another mounting variation for the safety guard of the invention. Here, a mounting plate unit 170 is fixed to post 152, with mounting plate unit 170 including a first side plate 172, a second side plate 173 and a connecting plate 175 so as to be generally U-shaped. A series of holes 177 are provided in first side plate 172, while other holes 179 are provided in connecting plate 175. As shown, second side plate 173 projects higher than first side plate 172 and leads to an upper plate 184 which is also provided with various holes 186. For structural integrity purposes, a support gusset 188, extends between second side plate 173 and upper plate 184, while a lower support gusset 191 extends between post 152 and connecting plate 175.

This overall configuration provides for an advantageous overall mounting arrangement, particularly in connection with vehicles which have undercarriage body portions which are raised quite high, such as many school buses. Here, side wall 33 of vehicle 2 is positioned between first and second side plates 172 and 173, with a lower end 194 of side wall 33 abutting connecting plate 175. At this point, mounting plate unit 170 can be secured to side wall 33 in the same way described above with respect to other embodiments of the invention in order to cantilever the frontal guard. However, for further support, upper plate 184 can be mounted to the vehicle undercarriage, particularly a frame or chassis beam 196 or a floor board 198 extending across various frame beams 196. In the particular embodiment depicted, upper plate 184 extends substantially perpendicular to second side plate 173 so as to project substantially horizontally, thereby abutting right up against floor board 198. With this arrangement, fasteners (not shown), such as bolts, rivets or the like, can be conveniently used to secure upper plate 184 directly to floor board 198 through the use of holes 186, thereby providing a robust mounting arrangement which can be used on a wide range of vehicles.

In connection with each of the embodiments disclosed, the overall safety guard is preferably formed as a one-piece unit which is mounted in front of select vehicle wheels and across a portion of the underbody, such as in the order of 2 feet, while having a minimal gap between the safety barrier and the ground. Certainly, the provisions provided for vertically adjusting the frontal guard aids in assuring an effective ground clearance for a wide variety of vehicles. The frontal guard can be formed of plastic, rubber, urethane, aluminum or steel, although other known materials could be used to create a physical barrier strong enough to push a child or adult from in front of the wheels. For instance, it would be possible to manufacture at least a portion of the frontal guard from recycled tire rubber or fiberglass: To reduce the weight and thickness of the frontal guard, it is possible to employ an inner wire mesh for internal strengthening without sacrificing overall effectiveness. Although not shown, the support post could be telescoping or otherwise vertically adjustable for lowering or raising the front guard to accommodate road clearance issues. In the embodiments employing a wheel cover, threaded clamps can be employed in securing the wheel cover to the side panel to more readily accommodate various wheel well sizes on different makes and models of vehicles. In addition, it should be realized that the side mount can be either exposed to the outside of the vehicle or inside of an outermost side panel or covering. In any case, although described with reference to preferred embodiments of the invention, it should be readily understood that various changes and/or modifications can be made to the invention without departing from the spirit thereof. In general, the invention is only intended to be limited by the scope of the following claims.

I claim:

1. A vehicle comprising:
a body having a side panel, a frame and a floor board;
a pair of front steerable wheels spaced in a transverse direction of the body of the vehicle;
at least one pair of transversely spaced rear wheels which are longitudinally spaced from the front steerable wheels;
a door provided along the at least one side panel; and
a safety guard assembly for deflecting animate body parts from in front of at least one of the front and rear wheels, said safety guard assembly including:
a mounting plate unit secured to the side panel and at least one of the frame and the floor board; and
a frontal guard piece attached to the mounting plate unit and cantilevered beneath the body in front of the at least one of the front and rear wheels so as to be positioned to prevent the animate body parts from being run-over and crushed by the at least one of the front and rear wheels.

2. The vehicle according to claim 1, said mounting plate unit including a first side plate directly mounted to the side panel and an upper plate mounted to at least one of the frame and the floor board.

3. The vehicle according to claim 2, further comprising:
a plurality of spaced holes formed in the first side plate;
a plurality of spaced holes formed in the upper plate; and
a plurality of mechanical fasteners extending through the plurality of spaced holes to fixedly secure the mounting plate to the body.

4. The vehicle according to claim 2, wherein said mounting plate unit includes a second side plate secured to the first side plate through a connecting plate such that the mounting plate unit is generally U-shaped, with the second side plate extending behind the side wall of the vehicle.

5. The vehicle according to claim 1, further comprising a support post and a sleeve interconnecting the frontal guard and the mounting plate unit, with the sleeve extending about and being secured to the support post.

6. The vehicle according to claim 5, wherein the sleeve is vertically adjustably attached to the support post.

7. The vehicle according to claim 6, wherein the frontal guard piece is fixed for vertical movement with the sleeve.

8. The vehicle according to claim 6, wherein the sleeve is provided with aligned holes and the support post includes various vertically spaced sets of aligned through holes, said safety guard assembly further including a mechanical fastener extending through the aligned holes of the sleeve and a select set of the aligned through holes in the post to provide for vertical adjustability.

9. The vehicle according to claim 6, wherein the support post and the sleeve have complementary, polygonal shaped cross-sections.

10. A safety guard assembly for deflecting animate body parts from in front of at least one of the front and rear wheels of a vehicle comprising:
a mounting plate unit configured to be secured to a side panel and at least one of a frame and a floor board of a vehicle; and
a frontal guard piece attached to the mounting plate unit and adapted to be cantilevered beneath a body of the vehicle, in front of the at least one of the front and rear wheels so as to be positioned to prevent the animate body parts from being run-over and crushed by the at least one of the front and rear wheels.

11. The safety guard according to claim 10, wherein said mounting plate unit includes a first side plate configured to be directly mounted to a side panel of a vehicle and an upper plate configured to be mounted to at least one of a frame and a floor board of the vehicle.

12. The safety guard according to claim 11, further comprising:
a plurality of spaced holes formed in the first side plate;
a plurality of spaced holes formed in the upper plate; and
a plurality of mechanical fasteners adapted to extend through the plurality of spaced holes for fixedly securing the mounting plate unit to a vehicle.

13. The safety guard according to claim 12, wherein said mounting plate unit includes a second side plate secured to the first side plate through a connecting plate such that the mounting plate unit is generally U-shaped, with the second side plate being adapted to extend behind a side wall of a vehicle.

14. The safety guard according to claim 11, further comprising a support post and a sleeve interconnecting the frontal guard and the mounting plate unit, with the sleeve extending about and being secured to the support post.

15. The safety guard according to claim 14, wherein the sleeve is vertically adjustably attached to the support post.

16. The safety guard according to claim 15, wherein the frontal guard piece is fixed for vertical movement with the sleeve.

17. The safety guard according to claim 15, wherein the sleeve is provided with aligned holes and the support post includes various vertically spaced sets of aligned through holes, said safety guard assembly further including a mechanical fastener extending through the aligned holes of the sleeve and a select set of the aligned through holes in the post to provide for vertical adjustability.

18. The safety guard according to claim 15, wherein the support post and the sleeve have complementary, polygonal shaped cross-sections.

19. A method of deflecting animate body parts from in front of a wheel of a vehicle including a body having a side panel, a frame and a floor board, a pair of front steerable wheels spaced in a transverse direction of the body of the vehicle, at least one pair of transversely spaced rear wheels which are longitudinally spaced from the front steerable wheels, and a door provided along the at least one side panel, said method comprising:
- securing a mounting plate unit to the side panel and at least one of the frame and the floor board of the vehicle;
- supporting a frontal guard piece from the mounting plate unit such that the frontal guard piece is cantilevered beneath the body and in front of the wheel; and
- deflecting an animate body part from in front of the wheel by direct engagement with the frontal guard piece during movement of the vehicle so as to prevent the animate body part from being run-over and crushed by the wheel.

20. The method of claim 19, further comprising: supporting the frontal guard piece from a support post extending down from the mounting plate unit.

21. The method of claim 19, further comprising: vertically adjusting the frontal guard piece relative to the mounting plate unit to alter a ground clearance for the frontal guard piece.

* * * * *